Figure 1:
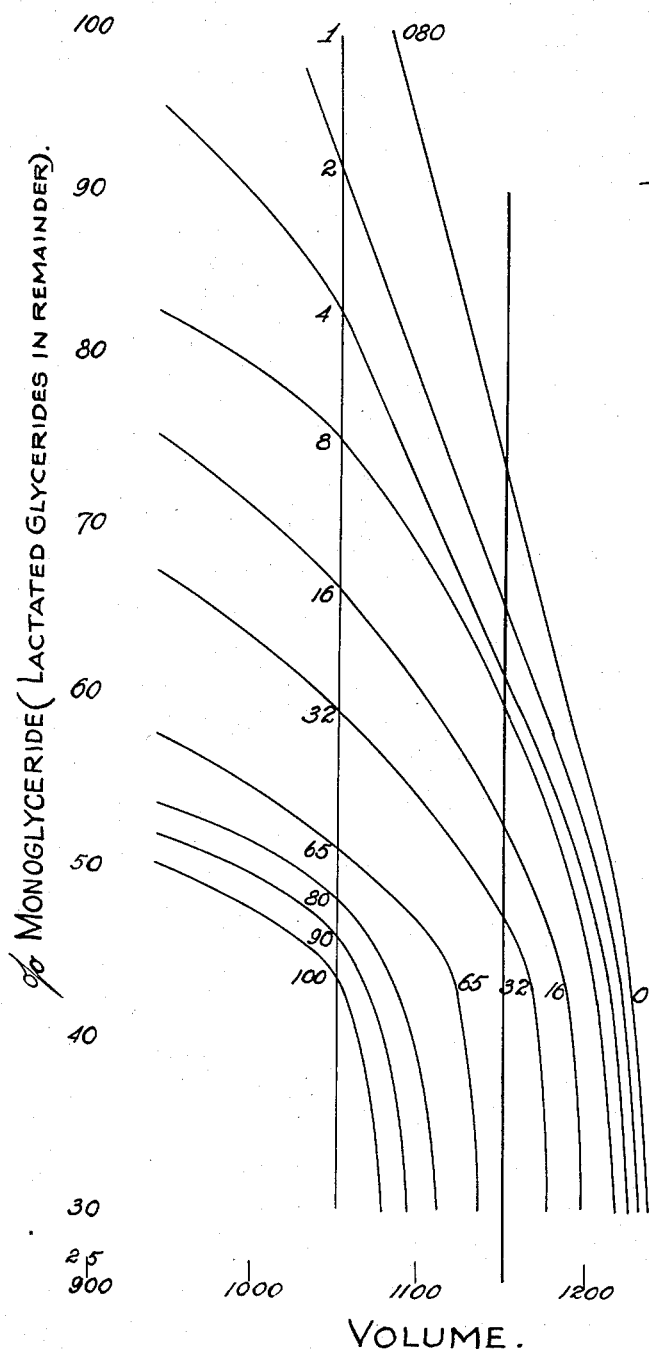

Jan. 17, 1961 — C. J. HOUSER — 2,968,563
LIQUID SHORTENING
Filed Jan. 21, 1958 — 2 Sheets-Sheet 1

POLYOXYETHYLENE SORBITAN MONOSTEARATE AT LEVEL OF .45 PERCENT.

MONOGLYCERIDE PLUS LACTATED GLYCERIDE MIXTURE AT LEVEL OF 3.5 PERCENT.

INVENTOR.
Charles Jack Houser
BY
Soans, Anderson, Luedeka & Fitch
Attorneys.

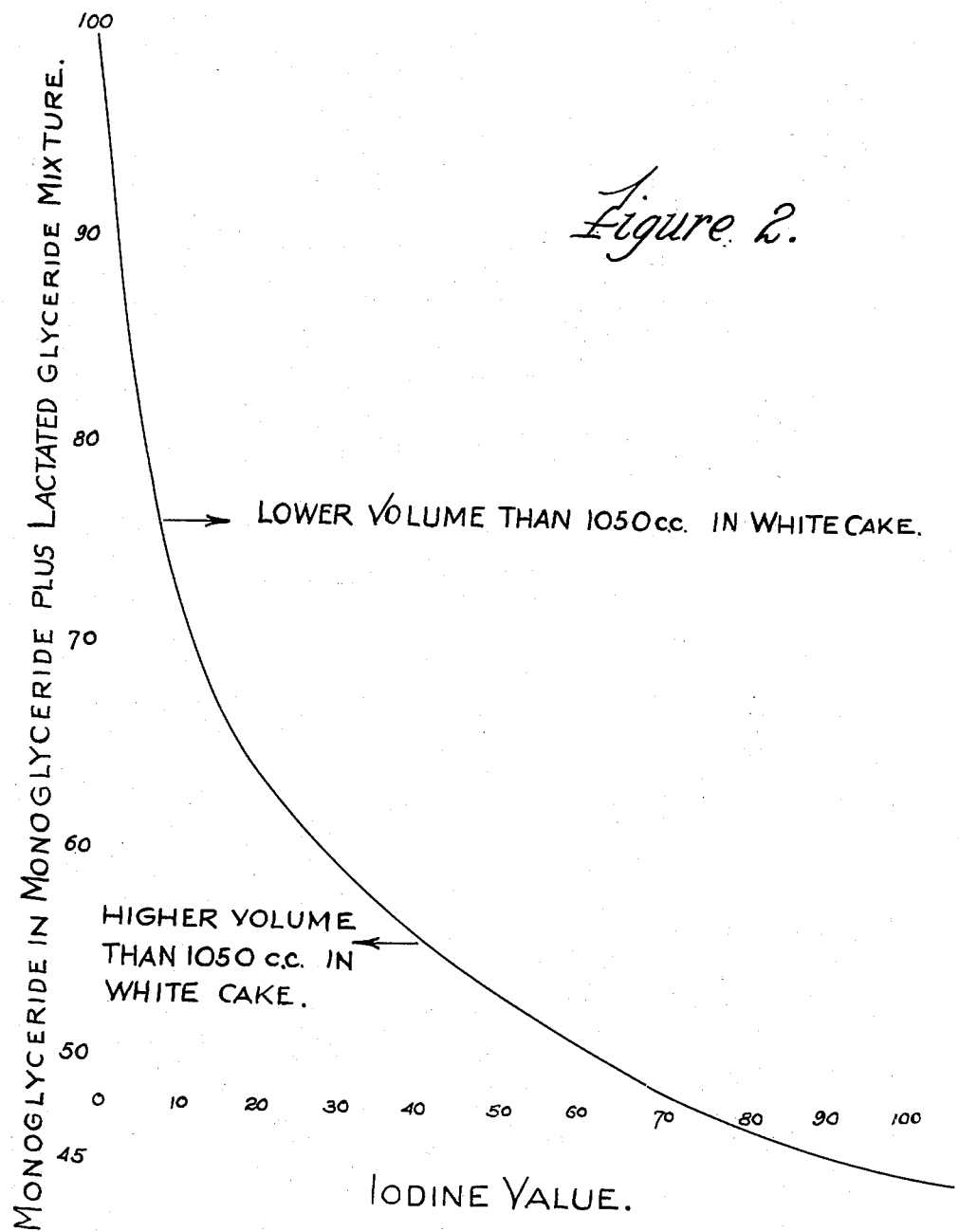

United States Patent Office 2,968,563
Patented Jan. 17, 1961

2,968,563

LIQUID SHORTENING

Charles Jack Houser, Champaign, Ill., assignor to National Dairy Products Corporation, New York, N.Y., a corporation of Delaware Filed Jan. 21, 1958, Ser. No. 710,308

4 Claims. (Cl. 99—118)

The present invention relates generally to extension of the use of edible liquid oils and, more particularly, it relates to a flowable or liquid shortening made from edible liquid oils for baking, frying and other food purposes. The invention not only relates to a flowable shortening product but also is directed to the process for making and using such a product.

As is well known, many shortenings are on the market today, and have been marketed for many years, for baking and cooking purposes. The more common shortenings are plastic, or semi-solid, in character and are prepared from hydrogenated vegetable oils, such as cottonseed oil and soy bean oil. To these shortenings are frequently added so-called emulsifiers in the form of mono- and di-glycerides, and such shortenings are referred to as emulsifier-type shortenings. These shortenings are good for baking cakes, frying and other cooking purposes. However, such shortenings are not pourable or flowable at room temperatures, and, consequently, are measured for baking and cooking purposes with some difficulty.

Another plastic shortening of this same general type has been and is being marketed, this shortening being made by "rearrangement" of lard. This shortening has much the same advantages as the hydrogenated vegetable oils mentioned above but, at the same time, has the inherent disadvantages of the plastic shortenings.

There are various liquid shortenings which have been and are commercially available. These liquid shortenings have had several disadvantages and, in this connection, these shortenings have not provided cakes with the volume, grain structure and/or eating qualities equivalent to that provided with the use of plastic shortenings. Furthermore, some of the available liquid shortenings on the market are not storage stable and layer or separate upon standing, thereby necessitating shaking or stirring prior to use. Accordingly, while readily measurable fats have been provided by presently available liquid shortenings, they have not provided a product which can be used to make cakes which are equivalent to those made with plastic shortenings. As a result, liquid shortenings have not generally had wide acceptance.

It has sometimes been said that liquid edible oils have shortening properties. However, it is generally recognized in the baking industry that such liquid oils have substantially inferior cake making properties when compared with emulsifier-type shortenings. In addition, the cake making properties of liquid oil are less than the cake making properties of those liquid shortenings now being marketed for use in place of emulsifier-type shortenings.

Therefore, it is a main object of this invention to provide means for improving the properties of edible liquid oils, and a more particular object is the provision of an improved liquid shortening and a method for making such a shortening. It is a further object of the invention to provide a liquid shortening which does not separate into layers, thereby providing a uniform product. It is also an object of this invention to provide a liquid shortening which can be used in cakes to provide a cake having a volume, grain structure and eating qualities like cakes made from plastic shortenings. It is still another object of this invention to provide a liquid shortening product which can be used in place of emulsifier-type shortenings in various recipes and for frying, which shortening, at the same time, can be conveniently stored and handled in a liquid state.

Still further objects and advantages of this invention will become apparent by reference to the following description and the accompanying drawings, in which:

Figure 1 is a graph which illustrates the general relation between the volume of white cake baked with certain liquid shortenings comprising cottonseed oil, polyoxyethylene sorbitan monostearate at a level of .45 percent and various mixtures of mono-glycerides and lactated glycerides, the mixture being present in the liquid shortening at a level of 3.5 percent. Along the axis of ordinates is plotted the percentage of mono-glyceride component in the mixture of mono-glyceride and lactated glycerides and along the axis of abscissas is plotted cake volume.

Figure 2 is a graph illustrating the relationship between the iodine value of the mono-glyceride component in the liquid shortening of this invention when plotted against the percentage of mono-glyceride component in a mixture of mono-glycerides plus lactated glycerides. The liquid shortening comprises, for purposes of this graph, cottonseed oil, polyoxyethylene sorbitan monostearate at a level of .45 percent and various mixtures of a mono-glyceride component and lactated glycerides, the mixtures being present at a level of 3.5 percent. The illustrated curve is for cake volumes of 1050 cubic centimeters. Points lying to the left of this curve provide higher cake volumes while points lying to the right of this curve correspond to lower cake volumes.

In accordance with this invention, the shortening properties of liquid edible oil are improved by adding to the oil a surface active agent, a mono-glyceride and a reaction product of glycerine with higher fatty acids and a water soluble acid having the general formula:

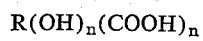

$$R(OH)_n(COOH)_n$$

where R is a hydrocarbon chain having from 1 to 5 carbon atoms and $n$ is 1 or 2. A fluidizing agent may be added to provide most satisfactory results.

The base oil is present in an amount from about 94 percent to about 98 percent of the liquid shortening. The mono-glyceride plus the reaction product comprises less than 3.5 percent and more than about .8 percent of the liquid shortening. Higher percentages of the mono-glyceride tends to limit the pouring qualities of the liquid shortening and such higher percentages are desirably avoided. The surface active agent is present in the liquid shortening in an amount from about .1 to about 2 percent.

The sum of the percentages of surface active agent, the mono-glyceride and the reaction product is in the range from about 1 percent to about 6 percent of the liquid shortening and is sufficient to provide satisfactory baking characteristics. The ratio of mono-glyceride to reaction product is adjusted to provide the desired baking characteristics.

The base oil is a liquid oil, such as cottonseed oil, soy bean oil, corn oil or mixtures thereof and, in general, the base oil should have an iodine value (I.V.) in excess of about 85, and should be substantially free of tri-saturated glycerides. The iodine value is primarily of significance to indicate the liquidity of the oil.

The liquid oil preferably has a "cold test" in excess of 5.5 hours. The cold test is a standard test in the edible oil industry and a standard method is provided by the American Oil Chemists Society. In this test, an oil sample is placed in a sealed four ounce bottle which, in turn, is placed in a bath of melting ice at 32° F. The base oil used in the practice of this invention desirably remains clear at the end of 5.5 hours in the bath, i.e., have a cold test in excess of 5.5 hours. Oils having cold tests in excess of 5.5 hours have more liquidity at lower temperatures and, therefore, the cold test of more than 5.5 hours is desired.

To the liquid oil is preferably added a fluidizing agent. This agent serves to maintain the liquidity of the product of the invention, particularly at lower temperatures. The manner in which the fluidizing agent performs is not altogether understood.

The mono-glyceride which is employed in the liquid shortening of this invention may be made from various oils, fatty acids, or oil or fatty acid fractions recovered from a wide number of treatments of and processing of glyceride oils. The mono-glyceride will normally be used in the form of a product comprising mono-, di- and tri-glycerides; this mixed product being generally referred to as a mono-glyceride component. For purposes of this invention, the mono-glyceride component should comprise at least about 35 percent mono-glycerides, measured as alpha mono-glycerides.

In general, the percent of mono-glyceride required is inversely proportional to the amount of surface active agent employed. That is to say, as the amount of mono-glyceride increases, the amount of surface active agent required decreases. When the mono-glyceride component is used, the amount of surface active agent is generally inversely proportional to the amount of mono-glycerides in the mono-glyceride component. Stated another way, as the percent of mono-glyceride in the mono-glyceride component decreases, the amount of surface active agent should increase.

The mono-glyceride should primarily comprise fatty acid radicals having more than 14 carbon atoms, and preferably should comprise a substantial portion of fatty acid radicals having 20 or more carbon atoms. The amount of surface active agent will vary inversely with the average legnth of carbon chain. In other words, as the average length of the fatty acid radical decreases, the amount of surface active agent will increase.

By way of example, the mono-glycerides for this invention can be prepared from menhaden oil, herring oil, tallow, peanut oil, soy bean oil, cottonseed oil, and corn oil, or mixtures thereof. These oils have fatty acid chains of desired length and can be utilized in the manufacture of the mono-glycerides. However, it has been found that menhaden oil is particularly satisfactory for making mono-glycerides for this invention. This oil has a substantial number of fatty acid radicals having carbon chains 20 and 22 carbons long. In this connection, menhaden oil has about 30 percent of $C_{20}$ and $C_{22}$ carbon chain acids.

As has been above indicated, the reaction product which is utilized in the liquid shortening of this invention may be prepared from various compounds. The fatty acid radicals in the reaction product should have chain lengths in excess of 12 in order to provide satisfactory practice of this invention. The fatty acid radicals of this invention are preferably provided from palmitic acid or higher homologs.

The fatty acid chains should be completely saturated although some results are obtained when the I.V. of the fatty acid portion is up to 35. In general, the results obtained are inversely proportional to the iodine value. In other words, as the iodine value increases, less desired results are obtained.

Various water soluble acids may be used in preparing the reaction product for use in the liquid shortening and, in this connection, lactic acid is the preferred acid. However, other acids, such as glycolic acid, sarcolactic acid, hydracylic acid, hydroxybutyric acid and malic acid, may be utilized. The acids may have an odd or even number of carbon atoms in their chain and they may be straight chain or branch chain compounds.

As has been indicated, the best results have been obtained with lactic acid and, in this connection, the ratio of the lactic acid to fatty acid in the preparation of the reaction product is preferably in the range of .4:1 to 2.5:1. The total acid to glycerine ratio in the preparation of the reaction product is preferably in the range of 1.5:1 to 3.0:1.

A reaction product may be obtained by the following procedure:

Two gram moles (524 gm.) of a mixture of fatty acids comprising 70 percent palmitic acid and 2 gram moles (206 gm.) of glycerine (90 percent pure) were heated to 90° C. while agitating with nitrogen and 1⅓ gram moles (140 gm.) of lactic acid (85 percent pure) were added. The system was evacuated to between 10 and 12 inches of mercury relative to 30 inches of mercury and refluxed at 185° C. for six hours while purging with nitrogen to remove water formed in the reaction. The condenser was held at 60° C. in order to pass water vapors but reflux the lactic acid. The vacuum was then increased to between 20 and 22 inches of mercury and held for three hours, after which the temperature was lowered to 90° C., the vacuum broken and the batch washed three times with 3 percent sodium sulfate solution. The product was then dried at 140° C. under vacuum with a nitrogen purge and filtered.

A reaction product may also be made by the following procedure:

Using a reflux apparatus as above, 296 gms. of completely hydrogenated edible tallow glycerides were heated to 165° C. and to it were added 67 gms. of glycerine (90 percent pure) containing 0.8 gm. of sodium hydroxide dissolved in water. (This mixture gives one gram mole of fatty acids and one gram mole of glycerine.) This mixture was held at 165° C. and agitated under 29 inches of mercury vacuum (relative to 30 inches of mercury) for 30 minutes, after which 1½ gram moles (140 gms.) of lactic acid (85 percent pure) were added and the resulting mixture agitated for two hours at 185° C. under 22 inches vacuum. The batch was cooled to 90° C., the vacuum broken and the batch washed three times with 3 percent sodium sulfate solution. The resulting material was dried at 140° C. under vacuum, using a nitrogen purge, and filtered.

The surface active agent should be substantially oil soluble or, at least, form a stable suspension in oil at the levels used and may be derived from the following classes of compounds or their equivalents:

(1) Partial esters of the fatty acids with hexahydric alcohols or their anhydrides.

(2) Polyoxyalkylene derivatives of the partial esters of the fatty acids with hexahydric alcohols or their anhydrides.

(3) Ester-ethers resulting from the reaction of fatty acids with alkylene oxides.

Particular compounds which have provided satisfactory results include:

(1) Polyoxypropylene mannitol dioleate
(2) Polyoxyethylene sorbitan tristearate
(3) Polyoxyethylene sorbitan monooleate
(4) Sorbitan monostearate
(5) Sorbitan sesquioleate
(6) Polyoxyethylene monostearate
(7) Polyoxyethylene sorbitan monostearate As has been previously indicated, the amount of surface active agent should be in the range of from about .1 percent to about 2 percent to provide the desired results of this invention.

We have found that various amounts of monoglyceride and of reaction product can be used to provide satisfactory cake making properties, providing a certain relation between mono-glyceride and reaction product is established. One such relationship is illustrated in Figure 1 of the drawings which, as previously pointed out, discloses the relationship between a cake volume, which is plotted along the axis of abscissas, and the percentage of mono-glyceride component in the mono-glyceride component-lactated glycerides.

The white cake test, which has been utilized in evaluating the liquid shortenings of this invention, is a somewhat standard test for evaluating emulsifier-type shortenings. This test is one of the more difficult tests for shortening and, the formula employed is for a richer type cake which contains a high proportion of sugar relative to flour.

The white cake is prepared by making a dry mix comprising the following ingredients in the stated amounts:

41.9 parts flour
    52.1 parts sugar
    1.0 part salt
    2.5 parts baking powder To 48.7 parts of the dry mix is added 10.0 parts of shortening and 16.0 parts of liquid, whole homogenized milk. The dry mix, shortening and milk are blended together, and to the blend is added a mix of 12.0 parts of egg white and 8.0 parts of liquid, whole homogenized milk. This complete mixture is then blended to a satisfactory batter and the batter specific gravity measured. The batter, in an amount of 420 grams is placed in an 8 inch cake pan and is heated in an oven at 350° F. After baking, the volume is measured by a standard procedure.

For purposes of Figure 1, the liquid shortening comprised polyoxyethylene sorbitan monostearate at a level of .45 percent and a mixture of mono-glyceride component (42 percent mono-glyceride) and glyceryl lacto palmitate, the mixture being at a level of 3.5 percent in the liquid shortening. The iodine value of the mono-glyceride is shown beside the respective curves. It will be seen, generally, from this graph that as the mono-glyceride component content of the mixture increases, it is necessary to provide mono-glycerides having lower iodine value to provide cakes of corresponding volume.

Two vertical lines have been drawn on the graph in Figure 1, one vertical line at a volume of 1050 cubic centimeters and another at a volume of 1150 cubic centimeters. It is necessary that the white cake have a volume in excess of 1050 cubic centimeters to provide cakes having a volume equal to or better than that provided by commercially available liquid shortenings. On the other hand, volumes in excess of 1150 cubic centimeters must be provided to provide cakes having a volume equivalent to that provided by available plastic shortenings.

Figure 2 represents a somewhat different presentation of the data and, in this connection, illustrates the relationships at the same cake volume (1050 cc.) between the iodine value of the mono-glyceride component, which is plotted along the axis of abscissas, and the percent mono-glyceride component in the mixture of mono-glyceride component and lactated glycerides.

While the graphs shown in the drawings represent a particular level of surface active agent and a specific level of the mixture of mono-glyceride and lactated glycerides, it will be understood that similar relations can be established for other reaction products and other levels of mixture comprising different reaction products and mono-glycerides.

It has been previously pointed out that it is desirable to add a fluidizing agent, and this is particularly the case when higher amounts of mono-glyceride are used and when mono-glycerides of longer chain length and lower iodine value are employed. Such an agent limits separation of the components of the liquid shortening. It is not altogether necessary, in the case of this invention, to use a fluidizing agent but for most satisfactory results such an agent is desirably used. A most satisfactory agent is an aluminum trisoap of a higher saturated fatty acid, the fatty acid having a carbon chain at least of 16 carbon atoms. The fluidizing agent should be present in the amount which prevents separation of phases at depressed temperatures and, in general, will be at a level in excess of about .02 percent but less than about .5 percent. A particularly satisfactory fluidizing agent is aluminum tri-palmitate. Other crystal agents may be employed, such agents including lecithin.

Example I

In accordance with this example, a base oil comprising cottonseed oil having an iodine value of 105 and a cold test in excess of 17 hours was used. To this base oil was added polyoxyethylene sorbitan monostearate (sold under the trade name of Tween 60) at a level of .45 percent. In addition, a mixture of a mono-glyceride component prepared from lard having an iodine value of 65, and a lactated glyceride was added to a level of 3.5 percent. The mono-glyceride component comprised 42 percent alpha mono-glyceride. The mole ratio of the lactic acid to fatty acid (comprising stearic acid and palmitic acid in a ratio of 70:30, these acids being derived from animal fat) used in the preparation of the lactated glyceride was about 1.5:1 and the ratio of total acid to glycerine, on a mole basis, was about 2.5:1. The mono-glyceride component comprised 43 percent of the mixture, the remaining portion of the mixture being the above-mentioned lactated glyceride.

The various ingredients were mixed together in accordance with the general procedure to be hereinafter described. The resulting liquid shortening was employed in the baking of a white cake, made in accordance with the standard procedure previously described. The resulting cake batter had a specific gravity of .92 and the cake had a volume of 1120 cubic centimeters. The cake had good texture and eating qualities.

By way of comparison, the use of cottonseed oil gave a cake batter having a specific gravity of 1.11, the cake having a volume of 940 cubic centimeters. Two commercially available liquid shortenings gave batters having specific gravities of 1.05 and 1.13, which gave cakes having volumes of 1040 and 935 cubic centimeters.

Example II

A liquid shortening was prepared in accordance with Example I except that the mono-glyceride component comprised 28 percent of the mixture. The white cake baked with the liquid shortening had a volume of 1135 cubic centimeters and was a good cake. The specific gravity of the batter was .88.

Example III

The same components were employed in preparing liquid shortening for this example but the mono-glyceride was present in the mixture at a level of 57 percent. The white cake prepared with the liquid shortening had a cake volume of 950 cubic centimeters and the batter specific gravity was 1.10. The cake was unsatisfactory. This illustrates that too high a percentage of mono-glyceride having 65 I.V. was used.

Example IV

In preparing the liquid shortening of this example, the same surface active agent and base oil were used in the same proportions as in Example I and a mixture of the lactated glyceride set forth in Example I and a hard fat mono-glyceride component prepared from beef fat having zero I.V. was used. The mono-glyceride component comprised about 42 percent alpha mono-glyceride. In the mixture, the mono-glyceride component comprised 43 percent of the mixture.

A white cake was made with the liquid shortening and the batter had a specific gravity of .80. The resulting cake had an excellent volume of 1225 cubic centimeters and the cake had excellent properties.

Example V

The same components were used in preparing the liquid shortening of this example as in Example IV except that the mono-glyceride component was present in the mixture at a level of 57 percent. The cake batter had a specific gravity of .86 and the resulting cake baked with this liquid shortening had a volume of 1195 cubic centimeters. This cake had good eating qualities and good texture.

Example VI

A liquid shortening was prepared with the ingredients set forth in Example IV except that the lactated glyceride was omitted from the mixture and additional tallow monoglyceride component was added to a level of 3.5 percent to replace the lactated glyceride. The white cake baked with this liquid shortening was made from a batter having a specific gravity of .94 and had a volume of 1080 cubic centimeters. This indicates the need for some lactated glyceride to provide a satisfactory volume with beef hard fat mono-glycerides even though it had been hardened to zero I.V.

Example VII

A liquid shortening was prepared with a base oil comprising cottonseed oil having an iodine value of 105 and a cold test of 17 hours. Polyoxyethylene sorbitan monostearate was added to a level of .45 percent and a mixture of a mono-glyceride component and a lactated glyceride, which was the same as that described in Example I. The mono-glyceride component comprised a mixture of lard and beef hard fat mono-glycerides. The mono-glyceride component comprised about 42 percent of alpha monoglycerides. The mono-glyceride component had 15 I.V. and comprised 43 percent of the mixture.

The white cake baked with the liquid shortening had an excellent volume of 1185 cubic centimeters and had good texture and eating qualities. The batter specific gravity was .87.

Example VIII

A liquid shortening was prepared with the same ingredients in the same proportions as in Example VII except that the mono-glyceride component had about 30 I.V. The white cake baked with the liquid shortening had a volume of 1165 cubic centimeters. The specific gravity of the batter was .90 and the cake was satisfactory.

Example IX

A liquid shortening was prepared with a base oil comprising cottonseed oil having an iodine value of 105 and a cold test of more than 16 hours. The surface active agent comprised polyoxyethylene sorbitan monostearate which was added to a level of .45 percent. A mixture of a mono-glyceride component and a lactated glyceride was added to a level of 3.5 percent. The mixture comprised 71 percent mono-glycerides prepared from menhaden oil having zero I.V. The lactated glyceride was the same as that set forth in Example I. A white cake was baked with this liquid shortening from a batter having a specific gravity of .85 and it had a volume of 1225 cubic centimeters and had good eating qualities and good texture.

Example X

A liquid shortening was prepared with the same ingredients in the same proportion as in the previous example except that a mono-glyceride made from beef fat component was employed, this mono-glyceride component having zero I.V. The white cake baked with this liquid shortening had a volume of 1195 cubic centimeters. The batter specific gravity was .84.

It will be seen from this and the previous example that the use of the tallow mono-glycerides, which has shorter chain fatty acid radicals than menhaden oil, provided a cake volume which was 30 cubic centimeters less than that provided with the use of menhaden oil mono-glycerides.

Example XI

In this example, the same ingredients were used in the same proportions as in Example IX except that the mixture comprised 43 percent of the mono-glyceride component. The resultant cake had good characteristics and had a volume of 1210 cubic centimeters. The batter specific gravity was .83.

Example XII

In this example, the same ingredients were employed in making the liquid shortening as were employed in Example XI except that the mono-glyceride component comprised mono-glycerides prepared from zero I.V. beef fat. A white cake was made with a specific gravity of .86 and it was baked. The cake had a volume of 1195 cubic centimeters.

A comparison with the previous example will show that the use of beef fat mono-glycerides, as distinguished from menhaden oil mono-glycerides, gave a cake having 15 cubic centimeters less volume. It will be seen that as the proportion of lactated glyceride increases in the mixture, the difference in cake volume between the use of mono-glycerides having longer and shorter chain lengths is less significant.

Example XIII

A liquid shortening was prepared with the same ingredients in the same proportions as in Example IX except that the mixture comprised only 29 percent of the monoglyceride component which was made from menhaden oil having zero I.V. A white cake baked with the liquid shortening had a volume of 1210 cubic centimeters. The batter specific gravity was .82. The cake had good eating qualities and good texture.

Example XIV

In this example, the same ingredients were used as in the previous example except that the monoglyceride component was made from beef fat having less than one I.V. The white cake baked with this liquid shortening from batter having a specific gravity of .82 had a volume of 1205 cubic centimeters. The cake had good eating qualities and good texture. The cake was substantially identical in volume, texture and grain as the cake of the previous example. Here again is illustrated the effect of using larger amounts of lactated glycerides in the mixture insofar as it affects the use of particular monoglycerides. In this connection and as has been previously pointed out, the use of larger percentages of lactated glycerides in the mixture permits the use of monoglycerides having shorter chain fatty acid radicals.

Example XV

In this example, a liquid shortening was made with the same ingredients and same proportions as in Example X. However, the mixture only comprised .40 percent of the surface active agent and the mono-glyceride component, that is to say, the lactated glyceride was omitted. The mono-glyceride component was added to a level of 3.5 percent to make up for the omitted lactated glyceride. The resultant cake baked with the liquid shortening had a volume of 1145 cubic centimeters. The batter specific gravity was .80 and the cake was satisfactory.

Example XVI

A liquid shortening was prepared in accordance with the previous example except that the mono-glyceride component was made from beef hard fat. The white cake baked with the liquid shortening had a volume of 1080 cubic centimeters. The cake batter specific gravity was .88. When the results of this example are compared with the results of the previous example, it will be seen that the particular mono-glyceride component employed, is quite critical. In other words, mono-glycerides with longer chain fatty acid radicals need to be used when there is no lactated glyceride present. It will also be noted, when this example and the previous example are compared with Examples XI to XIV, that the lactated glyceride provides substantially better cake baking results when employed in the mixture.

It has been found that the surface active agents alone in the base oil do not provide a liquid shortening of general utility. The use of mono-glycerides alone, even though made from zero I.V. oils having long chain fatty acid radicals, will not provide a cake of satisfactory character.

The use of the surface active agent of this invention, in combination with the reaction product of this invention, is described and set forth in a co-pending application filed on the same date as this application, it being entitled "Liquid Shortening," and bearing Serial No. 710,-175, filed January 21, 1958. Likewise, the use of the surface active agents of this invention, in combination with mono-glycerides, is disclosed and set forth in our co-pending application entitled "Liquid Shortening," which was filed on the same date as this application and which bears Serial No. 710,359, filed January 21, 1958.

It will be understood, of course, that various coloring agents may be added to provide a desired color to the liquid shortening. In this connection, beta carotene may be added for coloring purposes. Such coloring may be added to provide the desired color level and a satisfactory color may be provided by adding .0006 percent beta carotene.

It will also be understood that various stabilizers can be added to protect the liquid shortening. Such stabilizers are well known to those familiar with the art and protect the oil from deteriorating in flavor and quality. A highly satisfactory stabilizer is sold under the trade name of Tenox VI. It has been found that a level of .07 percent will provide the desired stability to the liquid shortening product of this invention.

The procedure for each of the examples set forth herein involves mixing the base oil with the mono-glyceride component and with the reaction product. The blend is heated to a temperature of 170° F. to 200° F. so as to melt all of the ingredients in the blend.

The blend is quickly chilled to a temperature of 50° F. in a cooling unit. The product passed through the unit at a rapid rate so that the temperature was dropped with agitation in about one minute. The unit effects vigorous agitation coincident with the temperature drop. The product was tempered at 85° F. for 24 hours. The resulting product did not separate in a two month period. The shortening was stable in the temperature range of about 40° F. to about 105° F.

The liquid shortening of this invention provides highly satisfactory cakes which maintain their freshness and it does not separate upon standing for extended periods of time. The shortening is readily measurable and can be used for frying, as a substitute for plastic shortening for recipes and various other cooking purposes.

It will be quite apparent from the foregoing description and disclosure that various combinations can be used in accordance with this invention. It is believed, however, that with the disclosure of this invention, these additional combinations can be determined within the skill of the art.

Various features of this invention which are believed to be new are set forth in the following claims.

I claim:

1. The combination as a liquid shortening, for improvements in baking, of an edible liquid oil, a surface active agent comprising at least one compound selected from the group consisting of partial esters of fatty acids with hexahydric alcohols or anhydrides thereof, polyoxyalkylene derivatives of the partial esters of fatty acids with hexahydric alcohols or anhydrides thereof, and ester-ethers resulting from the reaction of fatty acids with alkylene oxides, an edible mono-glyceride component, and a reaction product; said liquid oil having an iodine value in excess of about 85 and being substantially free of tri-saturated components, said surface active agent being present in an amount between about .1 and about 2 percent, said mono-glyceride component comprising at least 35 percent of mono-glycerides having more than about 14 carbon atoms in the fatty acid radicals, said mono-glyceride component being present in an amount in excess of about .8 percent, the sum of the reaction product and the mono-glyceride component being less than about 3.5 percent, said reaction product consisting essentially of glycerine combined with substantially saturated fatty acid radicals having an iodine value no greater than 35 and having carbon chains in excess of 12 and a water soluble acid having the general formula:

$$R(OH)_n(COOH)_n$$

wherein R is a hydrocarbon group having from 1 to 5 carbon atoms and $n$ is 1 or 2, said water-soluble acid to fatty acid ratio in the preparation of said reaction product being from 0.4:1 to 2.5:1 and the total acid to glycerine ratio being in the range of 1.5:1 to 3.0:1, said reaction product being formed by mixing said fatty acid and said water-soluble acid, together with said glycerine and reacting the mixture at elevated temperature, the sum of percentages of reaction product, surface active agent and mono-glyceride component being from about 1 percent to about 6 percent.

2. The combination as a liquid shortening, for improvements in baking, of an edible liquid oil, a surface active agent comprising at least one compound selected from the group consisting of partial esters of fatty acids with hexahydric alcohols or anhydrides thereof, polyoxyalkylene derivatives of the partial esters of fatty acids with hexahydric alcohols or anhydrides thereof, and ester-ethers resulting from the reaction of fatty acids with alkylene oxides, an edible mono-glyceride component, and a reaction product; said liquid oil having an iodine value in excess of about 85 and being substantially free of tri-saturated components, said surface active agent being present in an amount between about .1 and about 2 percent, said mono-glyceride component comprising at least about 35 percent mono-glycerides having more than about 14 carbon atoms in the fatty acid radicals in an amount in excess of about .8 percent the sum of reaction product and mono-glyceride component being less than about 3.5 percent, said reaction product consisting essentially of glycerine combined with substantially saturated fatty acid radicals having an iodine value no greater than 35 and having carbon chains in excess of 12 and a water soluble acid having the general formula:

$$R(OH)_n(COOH)_n$$

wherein R is a hydrocarbon group having from 1 to 5 carbon atoms and $n$ is 1 or 2, the proportion of said reaction product being adjusted relative to said mono-glyceride component to provide improved baking characteristics, said water-soluble acid to fatty acid ratio in the preparation of said reaction product being from 0.4:1 to 2.5:1 and the total acid to glycerine ratio being in the range of 1.5:1 to 3.0:1, said reaction product being formed by mixing said fatty acid and said water-soluble acid, together with said glycerine and reacting the mixture at elevated temperature, the sum of percentages of the reaction product, surface active agent and mono-glyceride component being from about 1 percent to about 6 percent.

3. The combination as a liquid shortening, for improvements in baking, of an edible liquid oil, a surface active agent comprising at least one compound selected from the group consisting of partial esters of fatty acids with hexahydric alcohols or anhydrides thereof, polyoxyalkylene derivatives of the partial esters of fatty acids with hexahydric alcohols or anhydrides thereof, and ester-ethers resulting from the reaction of fatty acids with alkylene oxides, an edible mono-glyceride component, and a reaction product; said liquid oil having an iodine value in excess of about 85 and being substantially free of tri-saturated components, said surface active agent being present in an amount between about .1 and 2.0 percent, said mono-glyceride component comprising at least about 35 percent mono-glycerides having more than about 14 carbons atoms in the fatty acid radicals in an amount in excess of about .8 percent, the sum of the reaction product and mono-glyceride component being less than about 3.5 percent, said reaction product consisting essentially of glycerine combined with substantially saturated fatty acid radicals having an iodine value no greater than 35 and having carbon chains in excess of 12 and lactic acid, the proportion of said reaction product being adjusted relative to said mono-glyceride component to provide improved baking characteristics, said water-soluble acid to fatty acid ratio in the preparation of said reaction product being from 0.4:1 to 2.5:1 and the total acid to glycerine ratio being in the range of 1.5:1 to 3.0:1, said reaction product being formed by mixing said fatty acid and said water-soluble acid, together with said glycerine and reacting the mixture at elevated temperature, the sum of percentages of the reaction product, surface active agent and mono-glyceride component being from about 1 percent and about 6 percent.

4. The combination as a liquid shortening, for improvements in baking, of an edible liquid oil, a surface active agent comprising at least one compound selected from the group consisting of partial esters of fatty acids with hexahydric alcohols or anhydrides thereof, polyoxyalkylene derivatives of the partial esters of fatty acids with hexahydric alcohols or anhydrides thereof, and ester-ethers resulting from the reaction of fatty acids with alkylene oxides, an edible mono-glyceride component, an edible fluidizing agent, and a reaction product; said liquid oil having an iodine value in excess of about 85 and being substantially free of tri-saturated components, said surface active agent being present in an amount between about .1 and 2.0 percent, said mono-glyceride component comprising at least about 35 percent mono-glycerides having more than about 14 carbon atoms in the fatty acid radicals in an amount in excess of about .8 percent, the sum of the reaction product and mono-glyceride component being less than about 3.5 percent, said fluidizing agent being present in an amount which will prevent phase separation at temperatures down to about 32° F., said reaction product consisting essentially of glycerine combined with substantially saturated fatty acid radicals having an iodine value no greater than 35 and having carbon chains in excess of 12 and a water soluble acid having the general formula:

$$R(OH)_n(COOH)_n$$

wherein R is a hydrocarbon group having from 1 to 5 carbon atoms and $n$ is 1 or 2, the proportion of said reaction product being adjusted relative to said mono-glyceride component to provide improved baking characteristics, said water-soluble acid to fatty acid ratio in the preparation of said reaction product being from 0.4:1 to 2.5:1 and the total acid to glycerine ratio being in the range of 1.5:1 to 3.0:1, said reaction product being formed by mixing said fatty acid and said water-soluble acid, together with said glycerine and reacting the mixture at elevated temperature, the sum of percentages of the reaction product, surface active agent and mono-glyceride component being from about 1 percent to about 6 percent.

References Cited in the file of this patent

UNITED STATES PATENTS

| | | |
|---|---|---|
| 2,266,591 | Eckey et al. | Dec. 16, 1941 |
| 2,418,668 | Royce | Apr. 8, 1947 |
| 2,746,868 | Cross et al. | May 22, 1956 |
| 2,815,286 | Andre et al. | Dec. 3, 1957 |
| 2,864,703 | Schulman | Dec. 16, 1958 |